M. A. BAKER.
AUTOMOBILE TRANSFER TURN TABLE.
APPLICATION FILED MAR. 16, 1910.
957,536.
Patented May 10, 1910.
2 SHEETS—SHEET 1.
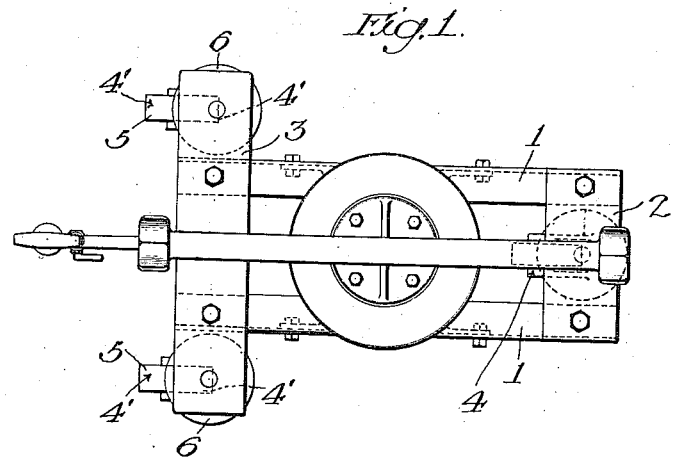
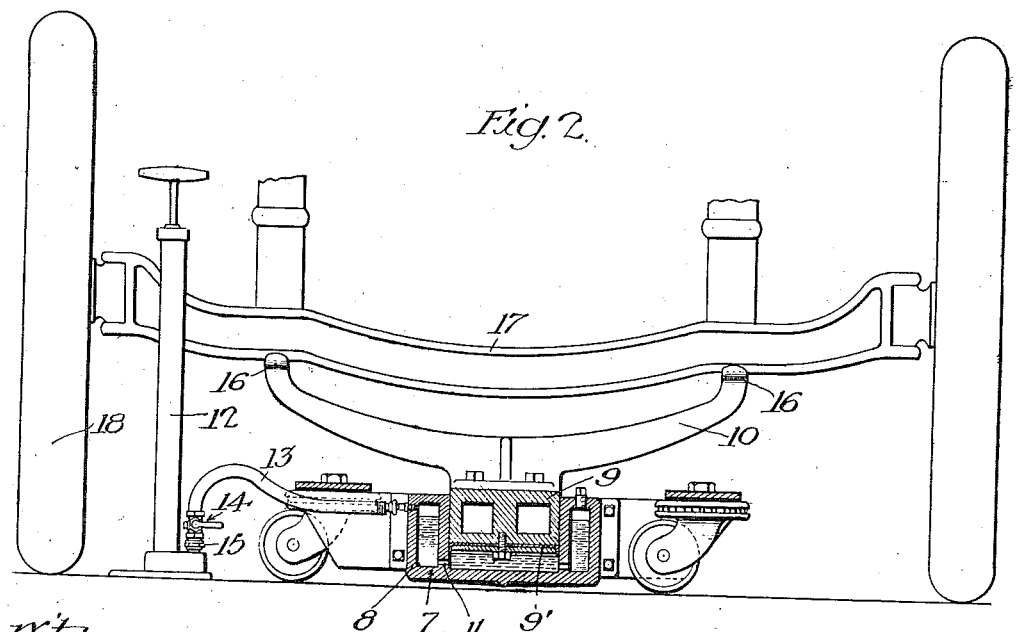

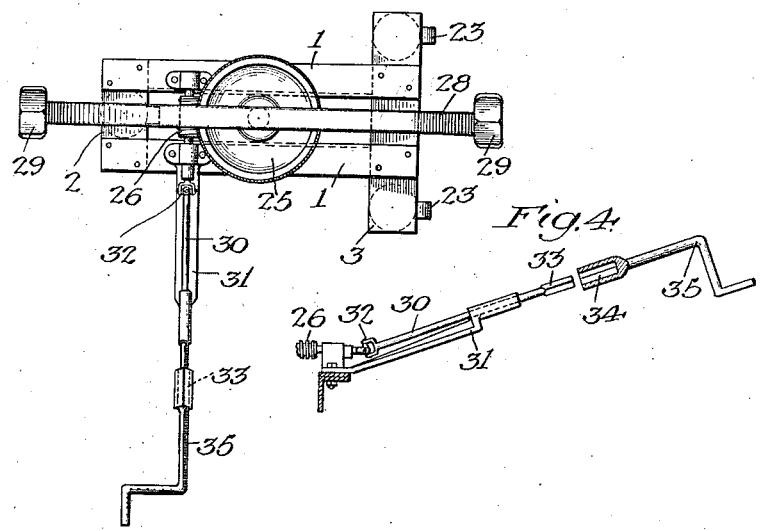
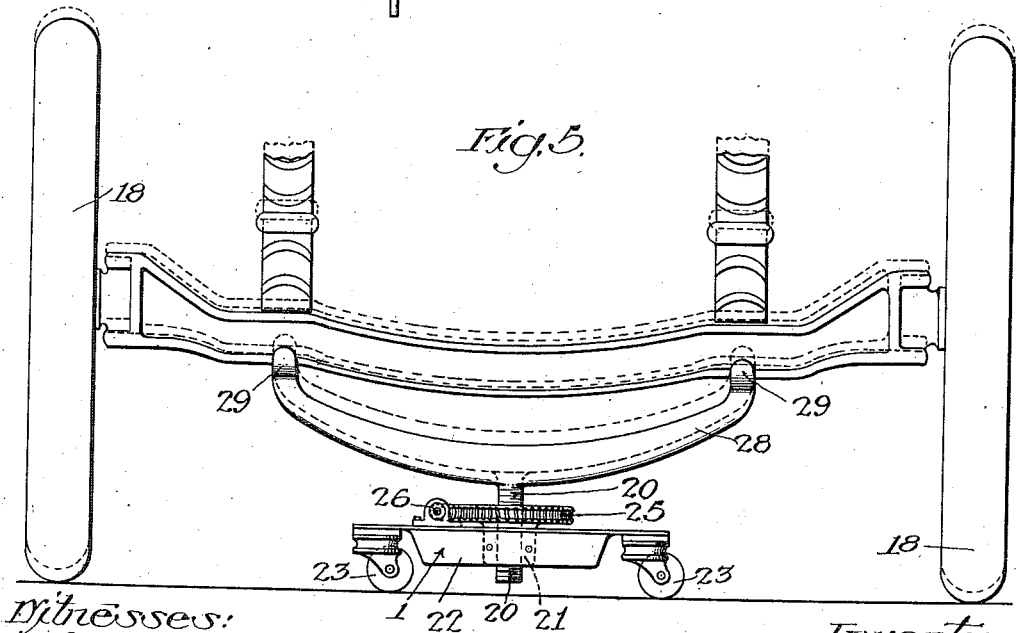

UNITED STATES PATENT OFFICE.

MILO A. BAKER, OF LOS ANGELES, CALIFORNIA.

AUTOMOBILE TRANSFER TURN-TABLE.

957,536.　　　　　Specification of Letters Patent.　　Patented May 10, 1910.

Application filed March 16, 1910.　Serial No. 549,758.

*To all whom it may concern:*

Be it known that I, MILO A. BAKER, a citizen of the United States, residing at Los Angeles, in the county of Los Angeles and State of California, have invented a new and useful Automobile Transfer Turn-Table, of which the following is a specification.

This invention relates to means for facilitating the turning of automobiles, for example, in garages where the space is limited and where it is sometimes desired to turn the automobile substantially on its own wheel base.

The main object of the invention is to provide means for lifting one of the axles of the automobile so as to raise one pair of wheels temporarily off the ground, and supporting said wheels on a caster or truck support which is capable of movement in various directions, enabling the automobile to be swung around upon the other pair of wheels as a center.

Another object of the invention is to provide means for the above stated purpose which can be readily brought into position for use, and operated in the manner stated.

Other objects of the invention will appear hereinafter.

The accompanying drawings illustrate the invention and referring thereto, Figure 1 is a plan of a form of the turn-table adapted to be operated by hydro-pneumatic means. Fig. 2 is a vertical section thereof showing in elevation one of the axles and a pair of wheels of the automobile in position to be lifted by the elevating means of the turn-table. Fig. 3 is a plan view of another form of the invention adapted for operation of worm gearing. Fig. 4 is a side elevation of the operating means for the worm gearing. Fig. 5 is an end elevation of the turn-table and automobile axle and wheels operated thereby.

Referring to the form of the invention shown in Figs. 1 and 2, the turn-table comprises a frame formed with longitudinal bars 1, cross bar 2 at the rear and cross bar 3 at the front. Casters are provided for supporting this frame upon the floor, for example, a caster 4 being provided centrally on the rear cross bar 2 and two casters 4' being provided on the front cross bar 3, forming a three-wheel caster truck. Each caster is provided with a running wheel 5 and with a bearing 6 preferably a ball bearing. On this truck is mounted means for elevating and supporting one of the axles of the automobile. In the form of the invention shown in Figs. 1 and 2, said means is operated hydro-pneumatically and comprises a cylinder 7 with a surrounding jacket 8, said cylinder 7 receiving a piston or plunger 9 movable vertically therein and provided with a yoke or carrier 10 adapted to support an axle of the automobile and said outer jacket 8 communicating through an opening 11 in the cylinder wall with the interior of cylinder 7 and being provided with means for applying fluid pressure to the said jacket. Oil or other liquid contained in the jacket 8 and cylinder 7 serves to communicate the pressure from the jacket to the bottom of the plunger. The pressure applying means preferably consists of a hand pump 12 or other source of compressed air connected by a pipe 13 through a manual valve 14 and detachable coupling or union 15 to the interior of the jacket 8. Piston 9 is provided with a packing cup or disk 9'. The yoke or carrier 10 may consist of two arms with forks or rests 16 at the upper ends of its arms to engage under the axle 17 of an automobile, as indicated in Fig. 2.

The operation of the device is as follows:—The turn-table is brought under one of the axles of the automobile with the rests 16 of the carrier 10 directly beneath the axle and with the caster wheels 5 extending in planes parallel to the axle, so that the axes of the caster wheels are transverse to the plane of the axle, the hand pump 12 is then operated to force compressed air into the jacket 8 and through the intermediation of the liquid in the said jacket and in the cylinder 7 to raise the plunger 9 and carrier 10, thereby lifting the automobile axle 17 and raising the wheels 18 thereon off of the floor. The automobile may then be turned by pushing the raised end laterally, this portion of the machine traveling on the truck caster wheels 5 in a transverse direction relatively to the automobile and the machine swinging or turning around the center of the other axle. In case the rear axle is raised, the machine swings around the center of the front axle, the front wheels turning differentially or oppositely, and in case the front axle is raised, the machine swings around the center of the rear axle, the differential gear permitting such movement.

In the form of the invention shown in Figs. 3 and 4, screw means are provided for raising the automobile axle, comprising a screw post 20 slidable vertically in a guideway 21 in the truck 22 carried by casters 23 and a worm gear 25 resting on the truck is internally screw threaded to work on said screw post and engaged by an operating screw 26. Screw post 20 is provided with a yoke or two-armed frame 28 having rests or forks 29 at its end for engaging under the automobile axle. In order to facilitate the operation of the screw 26, a driving connection may be provided therefor comprising a rod 30 extending obliquely upward and outward and rotatably mounted in a bracket 31, said rod having a universal joint or flexible coupling 32 with the said screw 26 and being provided at its outer end with a squared head 33 for engaging with a corresponding socket 34 on an operating handle 35. This form of the invention is used similarly to that above described, the mechanical operation by the handle 35, rod 30, screw 26, worm gear 25 and screw post 20 being substituted for the hydro-pneumatic operation above described.

What I claim is:—

1. An automobile transfer turn-table comprising a truck provided with casters, elevator means on said truck provided with a carrier for engaging and supporting an automobile axle, and operating means for said elevator means.

2. An automobile transfer turn-table comprising a truck provided with casters, elevator means on said truck provided with a carrier for engaging and supporting an automobile axle, operating means for said elevator means comprising a cylinder, a plunger therein connected to said carrier, and means for applying fluid pressure in said cylinder.

3. An automobile transfer turn-table comprising a truck provided with casters, elevator means on said truck provided with a carrier for engaging and supporting an automobile axle, operating means for said elevator means, comprising a cylinder, a plunger therein supporting the said carrier, a jacket surrounding said cylinder and communicating therewith, said jacket and cylinder adapted to contain liquid for communicating pressure from the jacket to the cylinder, and means for applying air pressure to the interior of the jacket above the liquid therein.

In testimony whereof, I have hereunto set my hand at Los Angeles, California, this 10 day of March 1910.

MILO A. BAKER.

In presence of—
G. T. HACKLEY,
FRANK L. A. GRAHAM.